United States Patent [19]
Davis et al.

[11] Patent Number: 5,347,564
[45] Date of Patent: Sep. 13, 1994

[54] AUTOMATED TRANSLATION INPUT SYSTEM

[75] Inventors: Mark F. Davis, Severna Park, Md.; Paul J. Glaser, Martinsburg, W. Va.; William H. A. Brandt, Baltimore; Rudolph Somwaru, Burtonsville, both of Md.

[73] Assignee: The Chesapeake and Potomac Telephone Company of Maryland, Baltimore, Md.

[21] Appl. No.: 811,370

[22] Filed: Dec. 20, 1991

[51] Int. Cl.$^5$ .................. H04M 3/26; H04M 7/06
[52] U.S. Cl. ...................................... 379/12; 379/14; 379/207; 379/219
[58] Field of Search ............... 379/9, 10, 12, 14, 15, 379/34, 201, 207

[56] References Cited

U.S. PATENT DOCUMENTS

| | | | |
|---|---|---|---|
| 3,655,921 | 4/1972 | Busick et al. | 379/15 |
| 3,916,113 | 10/1975 | Heck et al. | 340/826 |
| 3,920,927 | 11/1975 | De Luca | 379/15 |
| 3,980,839 | 9/1976 | Hutcheson | 379/15 |
| 4,017,691 | 4/1977 | Altenburger | 379/182 |
| 4,575,583 | 3/1986 | Kartalopoulos | 379/284 |
| 4,611,094 | 9/1986 | Asmuth et al. | 379/89 |
| 4,629,832 | 12/1986 | Carson et al. | 340/825.07 |
| 4,748,661 | 5/1988 | Edelstein et al. | 379/289 |
| 4,782,506 | 11/1989 | Sevcik | 379/10 |
| 4,782,517 | 11/1989 | Bernardis et al. | 379/201 |
| 4,799,256 | 1/1989 | Mattis et al. | 379/269 |
| 4,803,720 | 2/1989 | Newell et al. | 379/202 |
| 4,835,683 | 5/1989 | Phillips et al. | 395/11 |
| 4,928,304 | 5/1990 | Sakai | 379/94 |
| 4,959,854 | 9/1990 | Cave et al. | 379/157 |
| 4,972,453 | 11/1990 | Daniel, III et al. | 379/10 |
| 5,101,424 | 3/1992 | Clayton et al. | 379/10 |

Primary Examiner—Thomas W. Brown
Attorney, Agent, or Firm—Lowe, Price, LeBlanc & Becker

[57] ABSTRACT

An automated translation input system to convert Mechanized Translation System (MTS) orders into Recent Change Messages that can be loaded into a program controlled switch without enhancement or changes in the MTS program to provide a significant saving in Switching Control Center (SCC) labor hours. The new system and method permit using the output of the MTS which would otherwise constitute a printed form for inputting the Automated Translation Input System (ATIS) where the forms are analyzed, the associated Recent Changes are analyzed, and the Recent Change Messages are prepared. The thus prepared Recent Change Messages are inspected by the SCC technician who, through a manual option in the ATIS system, gives the command to download the translations directly into the switch. This eliminates the need for key preparation of the Recent Change forms by the SCC technicians and results in an elimination of keying errors and a significant saving in time. At the same time the MTS may provide its conventional printed forms to permit parallel handling of those change messages not selected for handling by ATIS.

20 Claims, 16 Drawing Sheets

```
Select Office To Review/Edit/Transfer RC Messages

OFFICE/REQUEST PACKET SELECTION

CENTRAL OFFICES      AVAILABLE REQUESTS
        BLTMMDEDCGO          EX0100254
        BLTMMDLBCGO          EX0100267
        CLMAMDEXCGO          EX0100269
        ESSXMDEXCGO
        PIVLMOPKCGO

"j" MOVE DOWN        "l" REQUEST COLUMN
        "k" MOVE UP          "h" OFFICE COLUMN

"CONTROL - z"  VIEW HIGHLIGHTED REQUEST
            <ESC>          EXIT
```

FIG. 7

```
MTS REQUEST:   RC Message SCC Transfer Exit

MTS REQUEST ( LINE  1 OF 3169 )  FORM: RCREQUEST   | RC MSG: RCREQUE
-------------------------------------------------  | ----------------
                                                   | NOT TRANSLATED

01/03/1991  13:21:05

FORM: RCREQUEST

OFFICE NAME: ESSXMDEXCGO       RCREQUEST NO

ISSUE DATE:     12/09/90

EFFECTIVE DATE: 02/01/91

PREPARED BY:    EL SHERMAN

REL. TRKORD:    FOR INFO: (301) 393-7088

ADDITIONS OR DELETIONS IN CONNECTION WITH:
    THIS ORDER AUGMENTS EX0100254 TO ALLOW
```

FIG. 8

MTS REQUEST: RC Message SCC Transfer Exit

MTS REQUEST ( LINE 1 OF 3169 ) FORM: RCREQUEST     RC MSG: RCREQUE

NOT TRANSLATED

01/3/1991  13:21:05

FORM: RCREQUEST

OFFICE NAME:        ES FORMS CONTAINED IN THIS MTS REQUEST

ISSUE DATE:         RCREQUEST    13006       1301
EFFECTIVE DATE:     1303C        1304A       1305
                    1305_2
PREPARED BY:

REL. TRKORD:

ADDITIONS OR DE     PRESS <CONTROL - z TO SELECT FORM
THIS ORDER AUGM

FIG. 9

MTS REQUEST: RC Message SCC Transfer Exit

MTS REQUEST ( LINE 265 OF 3169  FORM: 1301          RC MSG: 1301

FORM: 1301                SIX DIGIT TRAN            RC:DIGTRM:
                                                    RRP 0183
REPORT: PACKET    SCC: me1   UNIT: ESSXMDEXCGO  DAT CODE 205,
                                                    FAT 0021

| FOREIGN AREA TRANS. 1 2 8 0 | 1ST DIGIT 2 1 | 2ND & 3RD DIGITS 22 23 | RATE & ROUTE PATTERN 2 2 5 8 | MPA CODE | REMARKS |
|---|---|---|---|---|---|
|   | 002 | 2 | 05 | 0003 |   |   |
| C | 002 | 2 | 05 | 0183 |   |   |
|   |     |   |    |      |   | EXO100267 Da |
|   | 002 | 2 | 22 | 0003 |   |   |
| C | 002 | 2 | 22 | 0197 |   |   |
|   |     |   |    |      |   | EXO100267 Da |
|   | 002 | 2 | 25 | 0003 |   |   |
| C | 002 | 2 | 25 | 0211 |   |   |

RC:DIGTRM:
RRP 0197,
CODE 222,
FAT 0021
RC:DIGTRM:
RRP 0211,
CODE 225
FAT 0021
RC:DIGTRM:
RRP 0210,
CODE 232,
FAT 0021
RC:DIGTRM:
RRP 0216,

FIG. 10

```
TRANSLATED ATIS REQUEST: Change Remove Add MTS
Change Highlighted Translation Line
MTS REQUEST ( LINE 265 OF 3169 ) FORM: 1301         RC MSG: 1301:
--------------------------------------------------  --------------
     RM: 1301                        SIX DIGIT TRAN  RC:DIGTRM:
                                                    RP 0183:,
  REPORT: PACKET   SCC: mel  UNIT: ESSXMDEXCGO  DAT CODE 205,
                                                    FAT 0021
  FOREIGN        2ND &   RATE &                     RC:DIGTRM:
  AREA    1ST    3RD     ROUTE    MPA               RRP 0197
  TRANS.  DIGIT  DIGITS  PATTERN  CODE   REMARKS    CODE 222,
   1 2     2     22       2 2                       FAT 0021
   8 0     1     23       5 8                       RC:DIGTRM:
                                                    RRP 0211
     002     2     05      0003                     CODE 225,
  C  002     2     05      0183                     FAT 0021
                                         EX0100267 Da  RC:DIGTRM:
     002     2     22      0003                     RRP 0210,
  C  002     2     22      0197                     CODE 232,
                                         EX0100267 Da  FAT 0021,
     002     2     25      0003                     RC:DIGTRM:
  C  002     2     25      0211                     RRP 0216,
```

FIG. 11

```
MTS REQUEST: RC Message SCC Transfer Exit

MTS REQUEST ( LINE 318 OF 3169 ) FORM: 1301    RC MSG: 1301
-----------+-------------------------------------------------
       00                                                  M:
                                                           ,
       00   FORM TRANSFER FOR ESSXOMDEXCGO/EX0100267       ,
  C    00   ----------------------------------------
            1300S                     1301                 M:
       00   1303C                     1304A                ,
  C    00   1305                                           ,

00                                                  M:
                                                           ,
  C    00         <CONTROL - T >   TRANSFER FORM           ,
                  <ESCAPE>         EXIT
                                                           M:
     FORM:                                                 ,
                                                           ,
     REPOR
                                                           M:
      FOR +-----------------------------------------------+
```

FIG. 12

```
TRANSLATED ATIS REQUEST: Change Remove Add Trans NextErr PrevErr MTS
Change Highlighted Translation Line
 MTS REQUEST (LINE 67 OF 101 ) FORM: 5300_3
------------------------------------------------------------
    (idit) (9.3)                                         5ESS
    REPORT: PACKET  BASE & CONTROL: 3d03d0  UNIT: MRPMMOPOSO
   +------+-------+------+------+--------------------------+-------+
   |      | INC   | CALL | CI   |                          | SAC   |
   | LDIT | DIGITS| TYPE | TYPE |   hag1/frdrrev           | OWNER |
   |      |       |      |      |   hag1/frdrrcv1          |       |
   +------+-------+------+------+                          +-------+
      001  211           NORMAL
   C  001  211           NORMAL SCROLL TO DESIRED OFFICE,
          ------------- RC MSG:     PRESS CONTROL - T
    FORM=9V3ZCNG,LDIT=001,          TO START TRANSFER
              iWCOMINGDIGITS=
```

FIG. 13

```
 MTS REQUEST:  RC-Message 5E-Transfer Exit
 Switch To RC MSG Window
  MTS REQUEST ( LINE 1 OF 101 ) FORM: RCREQUEST
------------------------------------------------------------

03/20/1991  15:13:01

FORM: RCREQUEST

OFFICE NAME: MRPMMOMPOSO    RCREQUEST NO: MP0110136
   +------------------------------------+
   |                                    |         RID DATE:
   |                                    |         WOT DATE:
   |                                    |
   | ENTER # OF RC MESSAGES TO TRANSFER: [500]  ---------------
   | ( MUST BE BETWEEN 1 AND 500 )      |
   +------------------------------------+
```

FIG. 14

5E_TRANSFER: forms_Trans Clerk_file Gen_File Exit
Transfer Entire Form to 5E Switch
MTS REQUEST ( LINE  67 OF 101 )  FORM: 5300_3
                                                    5ESS
(idit) (9.3)
REPORT: PACKET  EASE & CONTROL: 3d03d0  UNIT: WRPNPONPOSO

| LDIT | INC DIGITS | CALL TYPE | CI TYPE | MBR OIG | CODE IDX | ROUTE INDEX | POLY GRID | OFFC CODE | DESEP | PRE FIX | WZ1 REG | TERM LATA | SAC OWMER |
|------|------------|-----------|---------|---------|----------|-------------|-----------|-----------|-------|---------|---------|-----------|-----------|
|      | 001 211    | NORMAL    |         |         |          |             |           |           |       |         |         |           |           |
| C    | 001 211    | NORMAL    |         |         |          |             |           |           |       |         |         |           |           |

-------RC MSG: 5300_3
FORM = 9V3&CHG, LDIT = 002, INCOMINGDIGITS = 211MRNJ = TEST,CHG1

FIG. 15

```
5E_TRANSFER:  Form_Trans Clerk_File Gen_Tape_File Exit
Transfer Entire Form to 5E Switch
 MTS REQUEST ( LINE 67 OF 101 ) FORM: 5300_3
+--------------------------------------------------------------+
|           FORM TRANSFER FOR WRPNNDNPOSO/NPO110136            |
|--------------------------------------------------------------|
| FORMS in this request packer:                                |
|  Form #    Office      Type     %  | Form #     Office      Type      %
|  5300_3                            | 5300_3                           
|                                    |                                  
|                  "CONTROL-Z"  SELECT FORM                    |
|                  "ESCAPE"     EXIT                           |
|                                                              |
|     ( FORMS WITH OFFICE NAME HAVE BEEN PREVIOUSLY TRANSFERRED )
+--------------------------------------------------------------+
```

FIG. 16

```
; ?E = syntax error; invalid ;
< RCV:APPTEXT: OK
FORM=10V2&CHG,RTI=0110,ETYP=MUNT,DIGOLTD=00,PREFDIG,RMK="800
      TEMP ROUT (",CHG i ?E invalid character in input
: ABORTFORMI ?E 1 message lines <<< 1 Error  0 Warnings >>>
: FORM=10V2&OUT,TRI=0140,OUT I ?E 2 message lines   <<< 2 errors
     0 Warnings >>>
: MSGI 45-29 ACTION CONFLICT
: MSGI Cannot delete RTI 140 when used by SCR. Correct with view 10.10
: ABORTFORMI OK
: FORM=10V2&NEW,RTI=0900,ETYP=NUNT,TGM=0182,DIGDLTD=06,NEXTR
TI=0031,AMIIMD=W,OVLAPIND=N,$GPRO=TRAD,RTDESTYP=OTHER,
RMK="ATIS TEST",N EWI ?E 1 message lines <<< 1 error 1 Warnings >>>
: msgi ?e Duplicate form
: ABORTFORMK OK
: AND; PF
< RET_CODE IS 15

Press any key ...
```

FIG. 17

```
5E_TRANSFER:  Form_Trans  Clerk_File  Gen_Tape_File  Exit
Transfer Entire Form to 5E Switch
 MTS REQUEST ( LINE  67 OF  101 ) FORM: 5300_3
+---------------------------------------------------------------+
|                                                               |
|            FORM TRANSFER FOR MRPWMONPOSO/MP0110136            |
|---------------------------------------+-----------------------|
|FORMS in this request packet:          |                       |
| Form #      Office      Type   %      |                      &|
| 5300_3                                |                       |
|                                       |     hag1/frdrrev      |
|                                       |     hag1/frdrrev1     |
|+--------------------------------------+                       |
||                                      |                       |
|| Form NOT transferred.                | SCROLL TO DESIRED OFFICE
|| Communication Channel Busy!          | PRESS CONTROL-T TO START TRANSFER
||                                      | <ESCAPE> EXIT         |
|| Press any key to continue            |                       |
||                                      |                       |
|+--------------------------------------+-----------------------|
+---------------------------------------------------------------+
```

FIG. 18

```
5E_TRANSFER:  Form_Trans  Clerk-File  Gen_Tape_File  Exit
Transfer Entire Form to 5E Switch
 MTS REQUEST ( LINE  1 OF  462 ) FORM: RCREQUEST
+---------------------------------------------------------------+
|                                                               |
|                                                               |
|            FORM TRANSFER FOR FRDRMDFRDSO/FR0110395            |
|---------------------------------------+-----------------------|
|FORMS in this requaest packet:         |                       |
| Form #      Office      Type   %      |                      %|
| 5300_3                                |                       |
| 5301                                  |     hag1/frdrrev      |
| 5306                                  |     hag1/frdrrev1     |
|                                       |                       |
|                                       |                       |
|               "CONTROL-Z"  S          | SCROLL TO DESIRED OFFICE,
|                "ESCAPE"    E          | PRESS CONTROL-T TO START TRANSFER
| (FORMS WITH OFFICE NAME NAV           | No errors encountered.|
|                                       | Press any key to continue ...
+---------------------------------------------------------------+
```

FIG. 19

AUTOMATED TRANSLATION INPUT SYSTEM

BACKGROUND OF THE INVENTION

1. Technical Field

The present invention relates to operation support systems for a telecommunication network, particularly administration and maintenance of Stored Program Control (SPC) switching systems.

2. Description of the Prior Art

The operation and administration tasks in telecommunication networks relate essentially to reorganizing, changing and expanding system data, as for instance, the exchange, network, trunk group and subscriber connection data. It is important to be able to organize, modify or erase this data at any time during the operation of a system. The object of maintenance, on the other hand, is to maintain the functionality of a system by purposeful tests and to assure the operational quality of the exchange processes. The operating and maintenance personnel, therefore, must be able to communicate, via an operator station or man-machine interface, with the respective devices of the telecommunications system, where, for the dialogue with the operating and maintenance programs, particular operating procedures are given, as a rule, in an application-oriented command language (e.g., the so-called CCITT-MML or CCITT-Man-Machine Language).

Arrangements known until now for the operation and maintenance of telecommunications systems require extensive documentation, usually reflected in a plurality of manuals. Their content consists as a rule of descriptions of the permitted commands to the system, of the permitted reactions of the system, and of the operating procedures. The latter establish the individual operating and maintenance tasks, consisting of sequences or combinations of commands, must be organized with the simultaneous consideration of the system reactions. The operation of such a system can become very expensive and the danger of introducing errors into the process is substantial.

U.S. Pat. No. 4,782,506, issued Nov. 1, 1988, to Maximillian Sevcik, describes an operation support system for a Stored Program Controlled (SPC) Telecommunications System, such as a telephone exchange system. The control arrangement is inserted between the exchange and an operator station. The control arrangement comprises a processor, a first memory which contains the operating and maintenance knowledge of the system in the form of the CCITT Specification Language SDL/PR, a second correlation memory containing the definition for the formation of Man-Machine Language (MML) commands to the system and the formal description of the reactions expected from the system and a translator. On the basis of the data in the two memories the translator sends correct and properly structured commands directly to the system (switch) or effectively evaluates the reactions of the system (switch). The arrangement is intended to make possible a paperless operation.

U.S. Pat. No. 4,782,517, issued Nov. 1, 1988, to Bernardis et al., teaches a method for generating a response event in a telephone system and response to a request event to control the operation of a plurality of terminating means. This method allows an administrator of a telephone system to provide new service determinations in the telephone network. In order to determine response events (in response to received request events) for controlling the operation of the terminations of a service switch, an interpreter is provided with the plurality of data bases. The interpreter program executing on a processor interprets the request events from the service switch by accessing records within a data base which specifies system response. The patent is directed to a system and method for trialing, modifying and implementing telephone services for a telephone network.

U.S. Pat. No. 4,575,583, issued Mar. 11, 1986, to Kartalopoulos, describes a programmable digital controller which is used in a telephone system for generating a plurality of instructions. The instructions are used for controlling several machines or processors.

U.S. Pat. No. 4,972,453, issued Nov. 20, 1990, to Daniel III et al., describes an autonomous expert system for directly maintaining remote telephone switching systems. The expert system accesses a full report from a centralized service reporting center, establishes a data connection to the computer system reporting the fault, gathers data about the reported fault, analyzes the data and recommends maintenance procedures and replacement parts for a technician who the expert system dispatches to the remote system.

U.S. Pat. No. 4,835,683, issued May 30, 1989, to Phillips et al., teaches a computerized system for automating a decision making process and for recording decisions made from that process by formulating a decision record. The system includes a microcomputer which executes a system control program to select information units from a data base.

U.S. Pat. No. 4,748,661, issued May 31, 1988, to Edelstein et al., describes a circuit for translating predetermined telephone numbers to new digits sequences.

U.S. Pat. No. 3,655,921, issued Apr. 11, 1972, to Busick et al., describes a root translation system arranged to translate a combination of two, three or six numerical digits to a predetermined combination of three numerical digits.

U.S. Pat. No. 4,017,691, issued Apr. 12, 1977, to Altenburger, discloses a number translator, which is designed for converting line equipment number and party identification into directory number and class of service for local originating calls and for converting directory number into line equipment number, ringing code, and called class of service in connection with local terminating traffic.

The conventional, currently used method of making Recent Changes (RC) associated with screening, routing, trunking types and of translating these changes for program controlled switches such as the 1AESS and 5ESS switches involve the translation engineer preparing a packet using a system called the Mechanized Translation System (MTS). The MTS does nothing more than warehouse the data that is associated with the translations used for the switch. It is a records keeping system that defines the contents of the switch itself insofar as routing or translations or charging type information. When the translation engineer determines that a change associated with any of those translations in the switch are necessary he goes into the MTS system and generates a new packet. The packet constitutes a printed set of forms that are instructions which are sent to the Switching Control Center (SCC). The SCC technician who receives the packet from the translation engineer analyzes the packet and manually prepares Recent Changes for the switch. These instructions tell the switch to make a routing change or a route index-type change in the switch. Using the forms the SCC technician manually writes the corresponding switch command language translation changes pursuant to his knowledge and documentation which he has available. The technician then uses a teletype terminal or maintenance terminal connected to the switch via the maintenance channel and types the Recent Changes into the switch.

The process of preparing the recent changes and typing into the switch may take several days. As an example a packet that contains 1,000 Recent Changes may take the technician two weeks in conjunction with his other activities.

SUMMARY OF THE INVENTION

It is an object of the present invention to provide an Automated Translation Input System (ATIS) to convert Mechanized Translation System (MTS) orders into a Recent Change message that can be loaded into a program controlled switch such as a 1AESS or 5ESS directly without enhancement or changes in the MTS program, thereby resulting in a significant saving in SCC labor hours.

It is another object of the invention to provide an improved system and method for using the output of the MTS which would otherwise constitute a printed form for inputting the Automated Translation Input System (ATIS) where the forms are analyzed, the associated Recent Changes are analyzed, and the Recent Change message is prepared. The thus prepared Recent Change messages are inspected by the SCC technician who through a menu option in the ATIS system gives the command to download the translations directly into the switch. This eliminates the need for manual key preparation of the Recent Change forms by the Switching Control Center (SCC) technicians and results in an elimination of keying errors and a significant saving in time.

It is another object of the invention to provide an Automated Translation Input System capable of being driven by standard switch vendor translation forms for generating Recent Change messages.

It is yet another object of the invention to provide such an Automated Translation Input System having an ability to do recent changes both on-line and off-line using 9-track tapes. The Central Office Technician (COT) or SCC Technician has the option of selecting how Recent Changes should be loaded.

It is another object of the invention to provide a user-friendly tool that allows Central Office Technicians (COT's) to quickly process MTS request packets for 1A and 5E switches. The advantages of the new system and method include:

1. Eliminating much of the manual Recent Change (RC) typing required by COT's. Savings may be realized in regular and overtime COT expense for translation input activities. The technician is freed to perform switch maintenance and other essential functions rather than spending laborious hours typing RC messages.

2. Eliminating the troublesome RC typing errors to which large repetitive MTS packets are prone. The translation input is done correctly the first time.

3. Reducing the interval between MTS completion to SCC completion date. This may be as much as two weeks for a new LDIT in a 5ESS, by way of example. This could easily be reduced to one or two days with the new ATIS. The process is streamlined and customer services improved.

4. Easing translation input for major projects requiring network rearrangement, such as area codes blitz, interchangeable codes, 700/900 blocking, and the like.

5. Permitting quick rerouting of calls or rebuilding of translations in the case of an emergency.

6. Requiring no method or procedural changes in the Switching Control Centers (SCCs).

7. ATIS is not dependent upon the MTS for RC flow-through. Any system similar to MTS which has translation forms may be included. If a system prints translation input forms, the recent changes for those translations can be mechanized in ATIS.

8. Comprehensive support. ATIS offers on-site installation and testing of software, full training of COT's, a continual updating of forms as new generics are introduced, and on-going maintenance and development.

9. Relatively low costs.

These and other objects and advantages of the invention will become more apparent upon reading of the following specification, claims and drawings.

BRIEF DESCRIPTION OF THE DRAWINGS

FIG. 7 shows the OFFICE/REQUEST PACKET SELECTION screen.

FIG. 8 shows the screen with the original MPS request packet.

FIG. 9 shows the screen after the opening of the MTS Request Window.

FIG. 10 shows the screen with the MTS Request and RC MSG windows displayed.

FIG. 11 illustrates the screen showing the RC messages and the left-most (of 132) columns of the original MTS request packets in the MTS REQUEST window.

FIG. 12 shows forms of RC messages created by ATIS.

FIG. 13 shows the screen with a window opened to allow selection of the central office or switch.

FIG. 14 shows the screen illustrating the opening of a window to allow entry of the number of Recent Change messages to transfer.

FIG. 15 shows the screen illustrating the 5E-TRANSFER Menu.

FIG. 16 shows a screen having a window listing all forms for the current packet.

FIG. 17 shows a screen displaying all messages returning from the switch.

FIG. 18 shows a screen which results if the selected switch is busy.

FIG. 19 shows a screen which appears upon successful completion of the transfer process.

DESCRIPTION OF THE PREFERRED EMBODIMENT

Figure 1:
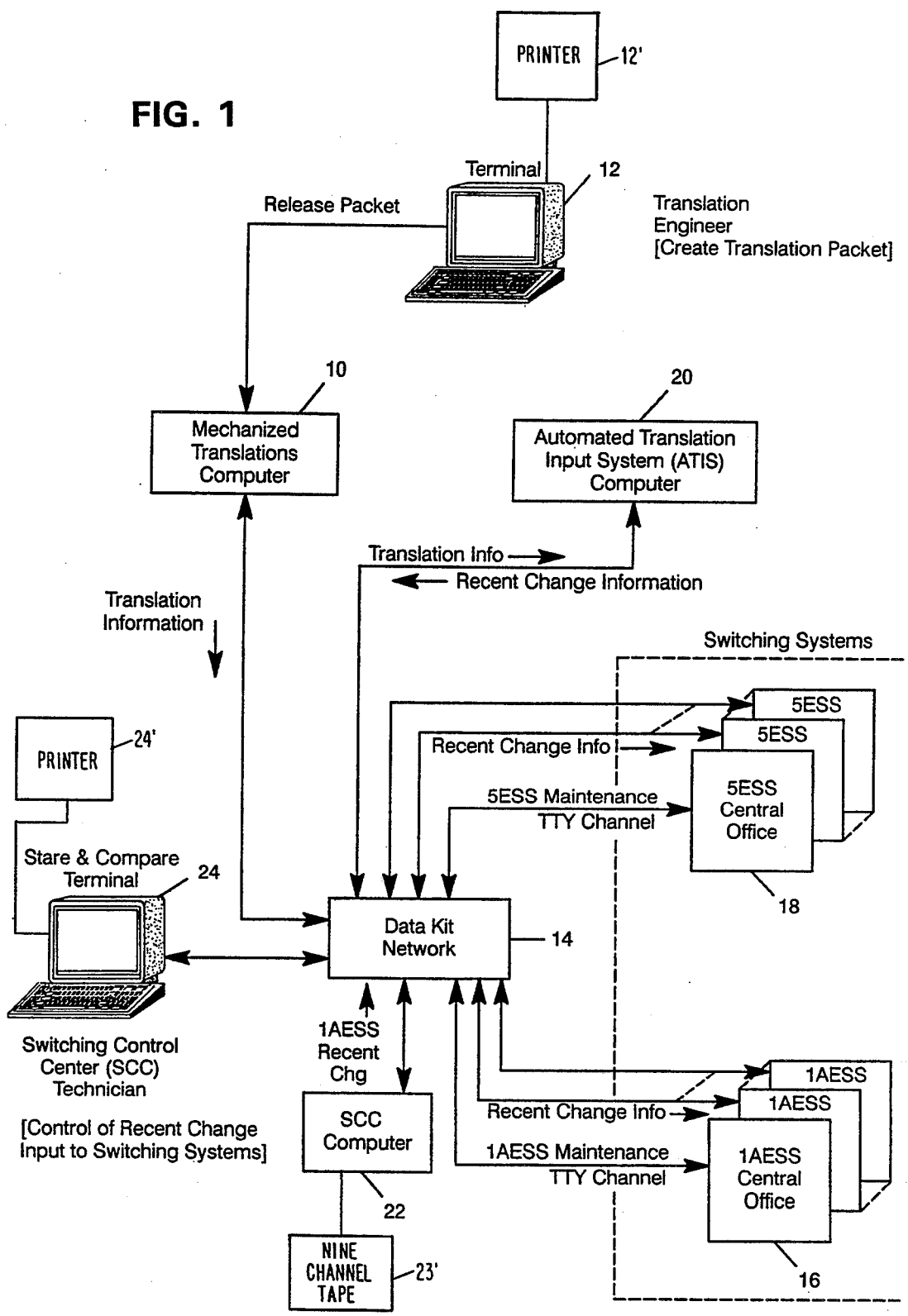
FIG. 1 is a diagrammatic illustration of the integration of the ATIS system for automated translation of Recent Change inputs to a conventional network having a plurality of different program controlled switches.

Referring to FIG. 1 there is shown a diagrammatic illustration of the integration of the ATIS system for automated translation of recent change inputs to a conventional network having a plurality of different program controlled switches. A mechanized translations computer 10 having a translation engineer terminal 12 is connected through a suitable network such as Data Kit Network 14 to central offices such as 1AESS central office 16 and 5ESS central office 18.

The MTS computer 10 may be an existing AT&T 3B computer such as that which currently houses the Mechanized Translation System. The Automated Translation Input System (ATIS) computer 20 also is connected to the Data Kit Network 14. The ATIS computer may also comprise an AT&T 3B computer. Also connected to the Data Kit Network is the conventional Switching Control Center (SCC) computer 22 having a terminal 24. The Switching Control Center (SCC) technician has access to script file in the SCC computer to edit files or change data. The ATIS computer utilizes modular software to functionally process packet data generated by the MTS as is described further herein. This stand-alone software may be constructed using INFORMIX and is able to interface with the Standard Query Language (SQL). As stated, the architecture permits the program to be run on existing AT&T 3B computers such as house the MTS.

Figure 2:
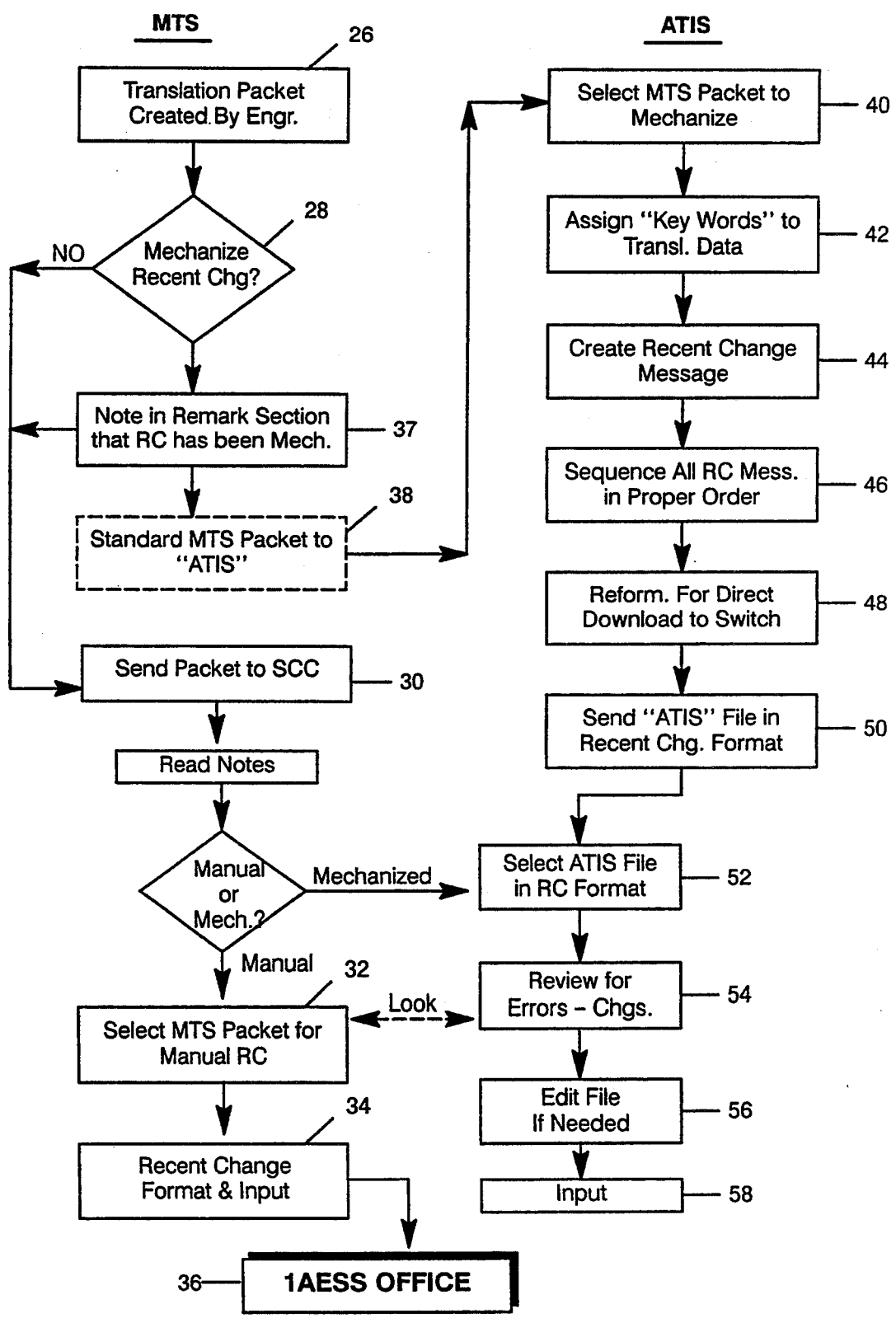
FIG. 2 is a flowchart which is compartmentalized to show the operation of the ATIS system while highlighting the MTS function and the Switching Control Center function.

Referring to FIG. 2 the functioning of the ATIS is illustrated in flowchart form compartmentalized to highlight the MTS function, the ATIS function, and the Switching Control Center function. Referring to that figure a translation packet is created by the MTS engineer at 26. At 28 a decision is made as to whether or not the translation packet should be mechanized. This decision is based upon a number of factors. If the number of forms to be handled is very limited, such as under five, the Recent Change messages may be just as readily handled manually as through the ATIS. In addition to this criterion certain forms are not recommended for handling by the ATIS for a variety of reasons; they have no Recent Changes associated with them, they are seldom if ever used, or they require only one or two inputs at a time, making it easier to enter them through an on-line system. If the packet is to be handled manually it is sent directly to the SCC at 30. At the SCC the MTS packet for manual RC handling is selected at 32 and the Recent Change format manually created and inputted to the 1AESS office at 34 and 36.

If the MTS packet is to be mechanized it is selected at 38. At the same time a note is entered in the Remark Section of the packet package at 37 to indicate the specific RC which has been mechanized and thus needs no manual handling at 32 and 34.

By way of example the initial release of ATIS includes the following forms and corresponding recent change formats:

| 1AESS FORMS | RECENT CHANGE |
|---|---|
| 1300B | RATPAT |
| 1301 | DIGTRN |
| 1303C | RI |
| 1304 | FLXRS |
| 1305 | FLXDG |
| 1308 | FLXRD |

The SCC technician handling the ATIS system has access to the contents of the MTS storage and may select the packet and/or forms for mechanization. If an MTS packet is to be mechanized it is copied to ATIS at 38 and the packet selected at 40 for handling by the ATIS process. The handling of that packet is indicated at 40–58 in FIG. 2 and is now described in detail.

Figure 3:
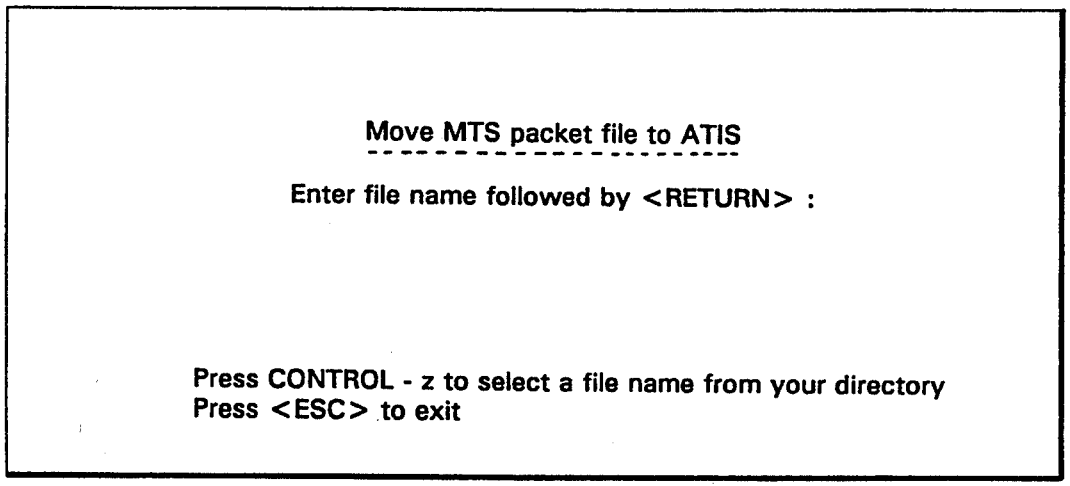
FIG. 3 illustrates the screen appearing on the SCC Technician's terminal 24 in FIG. 1 for selecting a file from the Translation Engineer's home directory.
Figure 4:
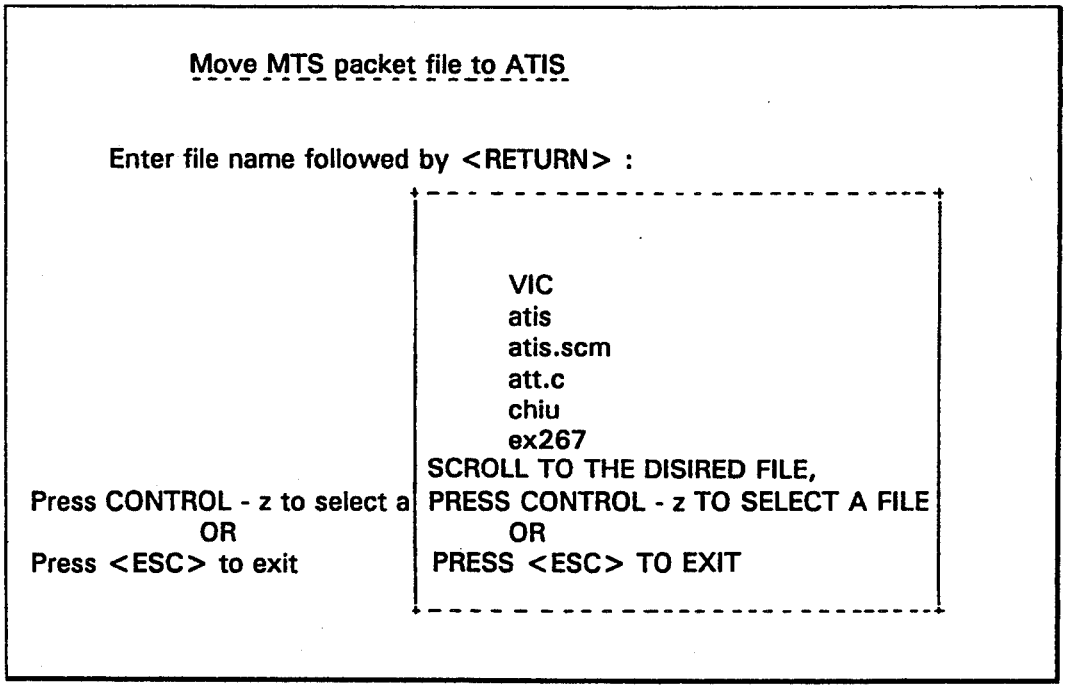
FIG. 4 shows the screen illustrating a window on all files currently in the home directory.

After the MTS request packet is completed and there are forms for ATIS to process, the Translation Engineer (TE) writes a file to the TE's home directory. ATIS provides for selecting a file from that directory. The screen illustrated in FIG. 3 is used for selecting a file from the TE's home directory. The prompt "CONTROL-z" opens a window on all files currently in the home directory as shown at FIG. 4. The ATIS user selects a file to be moved and the message "file 'name' moved successfully" is displayed on the bottom of the screen when the selected MTS file has been transferred successfully.

ATIS is stand-alone software that processes MTS request packets that were moved to ATIS. Processing of MTS request packets starts from the ATIS MAIN MENU where a request packet is selected. ATIS stores the RC messages and a Central Office Technician (COT) (or SCC Technician) can review and edit the RC messages before transferring them to the switch. The RC messages are stored in individual files by form number and are transferred independently of each other. Because each form number is sent individually, partial processing of a request packet is possible.

COTs do not have to print request packets generated by MTS. The packets can be viewed in ATIS in their original format together with the Recent Change messages created by ATIS. COTs can edit RC messages created by ATIS and save any changes. After reviewing/editing the RC messages, COTs can transfer the forms (separately by number) to the switch. As the final step, the COT must perform the usual "send-office" command for the 1A, or transfer interactively or make a clerk file for the 5E.

ATIS uses INFORMIX 4GL to create a user-friendly environment for COTs. Central Offices, request packets, forms and 5E switches are selected through the use of menus and pop-up windows. Typing is kept to a minimum, thus eliminating typing errors. Most keyboard commands are displayed on the screens.

The following steps describe the procedures in using ATIS:

1. Identify an MTS packet file to be formatted into RC messages by ATIS.
2. Review Recent Change messages created by the translation by selecting a Central Office and associated request packet.
3. Edit and save Recent Changes messages as required.
4. Transfer RC messages to the switch.
5. Archive and/or restore packets.

Figure 5:
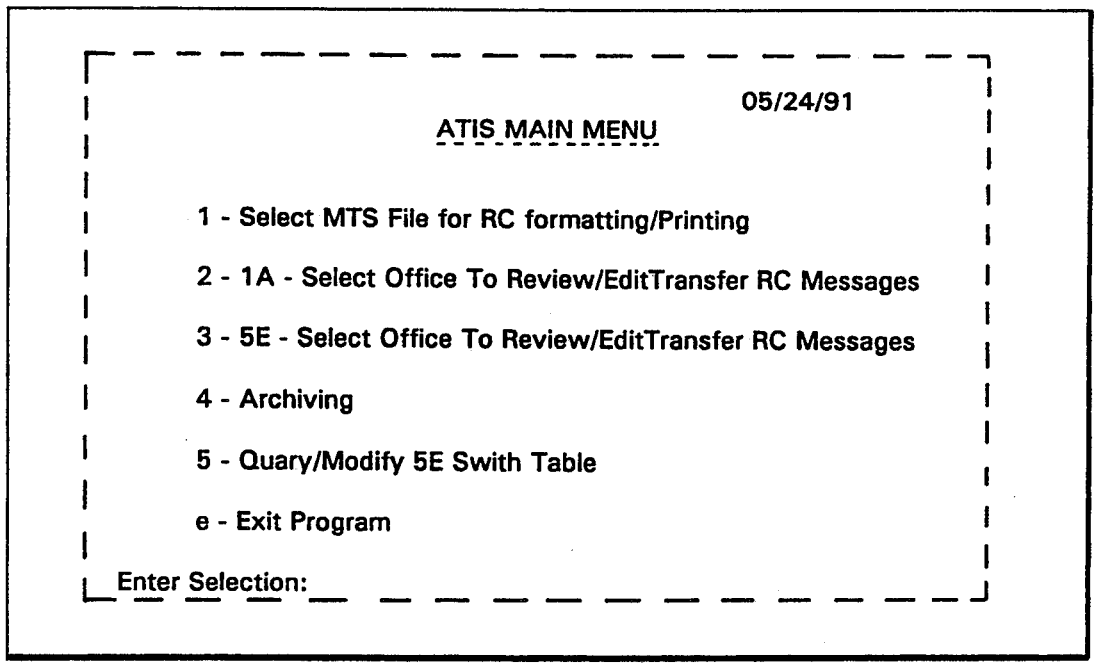
FIG. 5 illustrates the screen showing the ATIS main menu.
Figure 6:
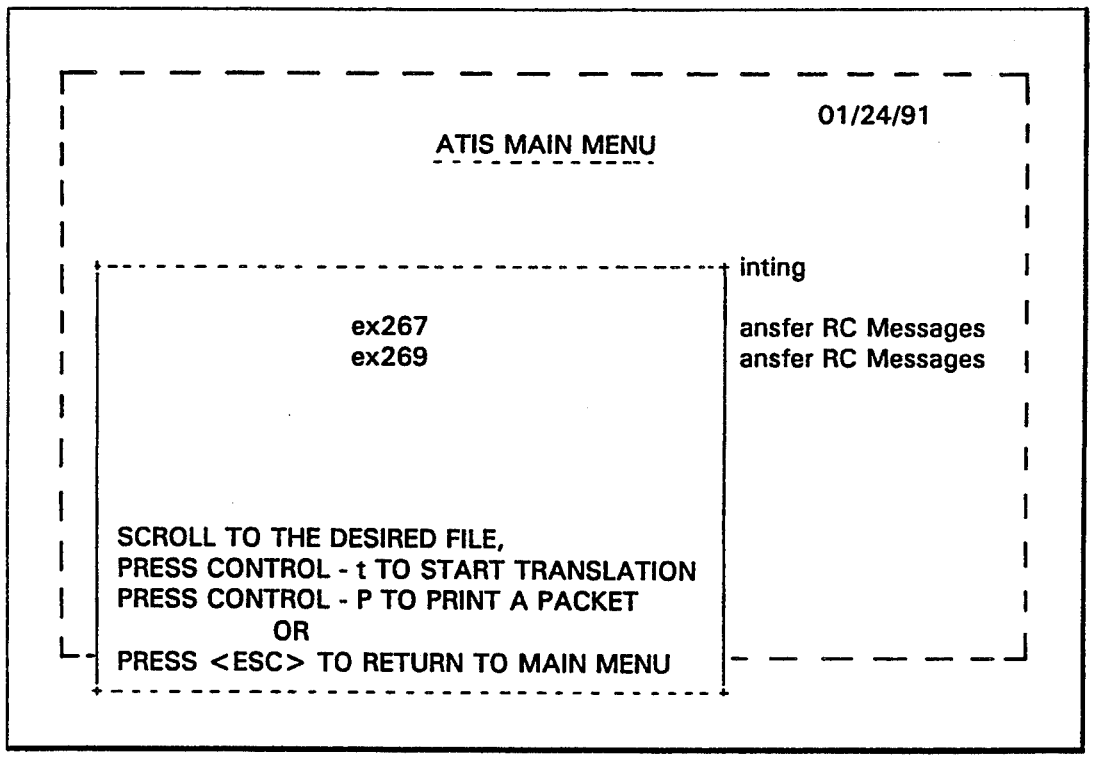
FIG. 6 shows the screen of the ATIS main menu after the opening of a window.

Upon entering the ATIS system the ATIS main menu illustrated in FIG. 5 is displayed. Option 1 from the ATIS main menu brings up the window shown in FIG. 6 and prompts the user to identify a file for ATIS to process into RC messages.

The OFFICE/REQUEST PACKET SELECTION screen shown in FIG. 7 is then displayed. As the scroll bar is moved to the various central offices, the request packets for that office are displayed in the right column under Available Requests. After a central office is selected, a packet must be selected from the Available Requests column for that office. ATIS next displays the screen shown in FIG. 8. A form can be selected by pressing "CONTROL-z" to display the MTS Request Window shown in the FIG. 9. With the MTS Request window active, any form can be selected. Assuming that Form 1301 is selected the screen in FIG. 10 with two windows, MTS Requests and RC MSG, is displayed. As forms are selected in the MTS Requests window, the corresponding block RC messages are displayed in the RC MSG window, as shown in FIG. 11.

The screen in FIG. 11 also displays the left most (of 132) columns of the original MTS request packet in the MTS REQUEST window. Shifting to the right is done by making the MTS REQUEST active and pressing the 1 (ell) key. The RC MSG window displays RC message keywords column-wise, but they are strung together when sent to 1A switches. This makes the use of the efficient and fast processing option available on 1A switches. By displaying RC messages column-wise in the RC MSG window, keywords can be easily deciphered and their relative position can be quickly seen. The punctuation is a part of the RC messages when they are strung together for inputting to the switch.

It is possible to edit (Change, Remove, or Add) in the RC MSG window. The new file can be saved with the changes.

Following review and saving changes (if any) of RC Messages in the RC MSG window, it is possible to transfer the RC messages from the form currently displayed in the RC MSG window by selecting SCC TRANSFER from the MTS REQUEST window. Forms of RC messages created by ATIS for the current request packet are displayed on the screen shown in FIG. 12.

After reviewing and saving the changes made to individual Recent Change messages, the individual RC messages may be transferred by selecting Trans from the TRANSLATED ATIS REQUEST menu. A window is opened as shown in FIG. 13 which allows selection of the 5E switch. By selecting 5E-TRANSFER from the MTS REQUEST menu the window of FIG. 14 is opened to allow entering of the number of Recent Change messages to transfer. The default value is 500, but may be changed to any number between 1 and 500. This value is used for all transfer types: immediate, Clerk or Tape.

After entering the number of RC messages, the 5E-TRANSFER Menu shown in FIG. 15 is displayed. By selecting Forms Trans an entire form is immediately transferred to a 5E switch. The window of FIG. 16 is displayed showing a listing of all forms for the current packet.

During the transfer process, all messages returning from the switch are displayed on the screen as shown in FIG. 17. If the selected switch is busy, the window shown in FIG. 18 is displayed. Pressing any key will close the message window and permit selection of another switch for exit of the window. Upon successful completion of the transfer process the window shown in FIG. 19 is displayed.

Figure 20A:
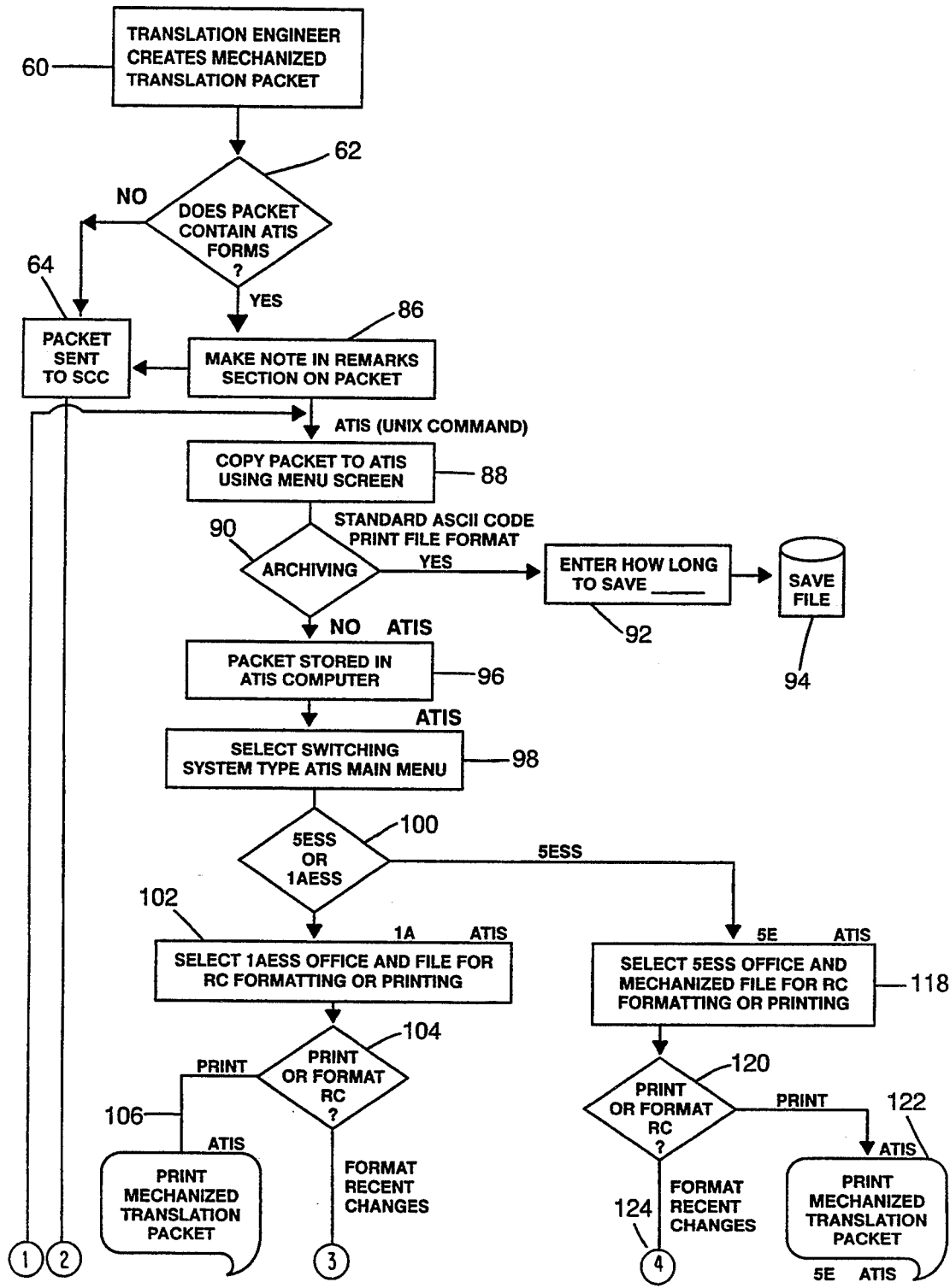
FIGS. 20A–C show a detailed flowchart of the processing of Recent Change messages according to the invention.
Figure 20B:
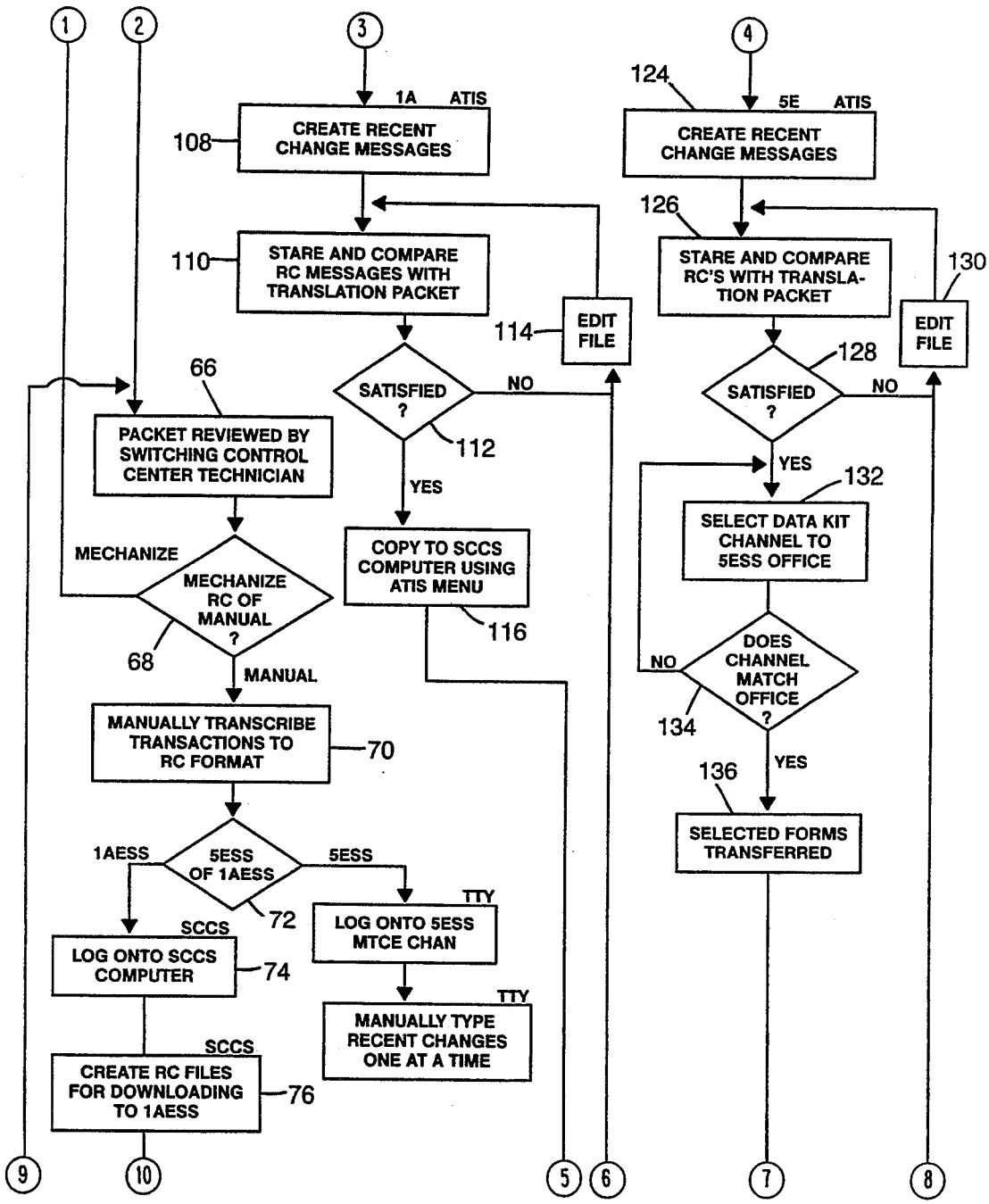
Figure 20C:
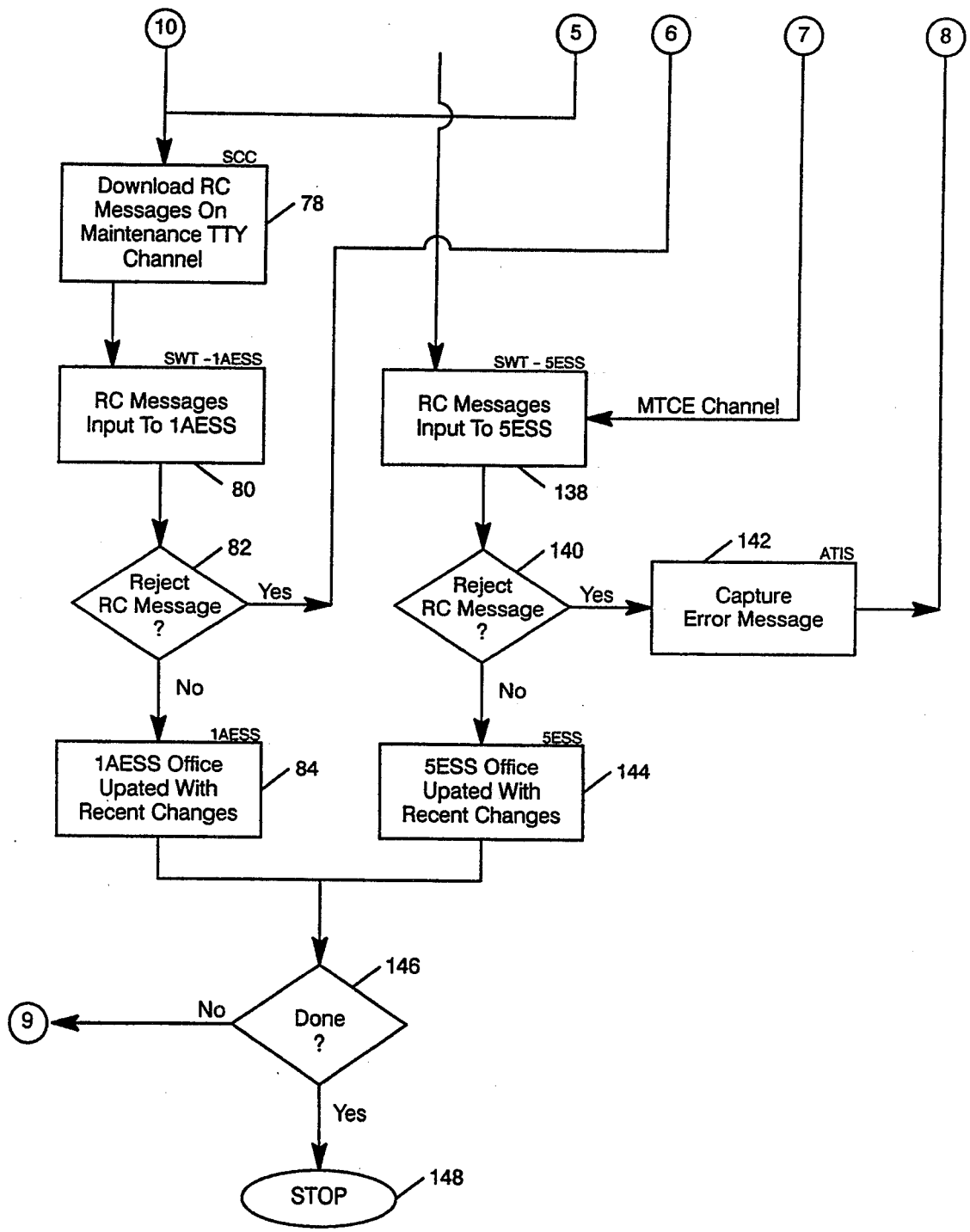

Referring to FIGS. 20A–C there is shown a detailed flowchart of the processing of Recent Change messages according to the invention. The process commences at 60 where the Translation Engineer creates the MTS packet. At 62 a decision is made as to whether the packet contains ATIS forms, i.e., forms intended for processing by the ATIS system. If the decision is NO the packet is sent to the SCC at 64 and is received and reviewed by the SCC technician at 66. As a result of this review the SCC technician has the option of determining that mechanized processing is desired and sends such forms to ATIS processing at the decision of 68.

The forms for manual processing are transcribed by the SCC technician into RC format at 70. At 72 the formatted RC messages are separated into 1AESS and 5ESS. The 1AESS messages are logged onto the SCC computer at 74 and RC files for downloading to the 1AESS switch are created at 76. At 78 the messages are downloaded onto the maintenance TTY channel and are inputted to the 1AESS switch at 80. At 82 rejected RC messages are diverted while acceptable messages are inputted to the 1AESS office to update the 1AESS switch with those recent changes at 84.

Returning to the decision at 62, the packets that contain ATIS forms proceed to 86 where the technician makes a note in the remarks section on the packet identifying those forms to be handled by the ATIS process to differentiate them from those forms to be handled manually by the SCC technician. The packet is thereupon copied to ATIS at 88 using the menu screen. At 90 a decision is made as to whether the packet should be archived and, if so, the duration of archiving is entered at 92 and the packet is saved at 94.

Packets passed through the archiving decision 90 are stored in the ATIS computer at 96. At 98 the ATIS main menu directs a selection of switching system type and this decision occurs at 100. At 102 the 1AESS office and file for RC formatting or printing is presented to the technician and the decision is made at 104 as to whether to print or format the RC message. The MTS packets selected for printing are printed at 106. The MTS forms for RC formatting proceed to 108 wherein the translations to Recent Change format occur. At 110 the technician views the translated RC messages simultaneously with the translation packet to detect possible errors. The edit/no edit decision is made at 112 and editing occurs at 114 with respect to those messages in need of editing. The acceptable RC messages are copied to the SCC computer at 116 using the ATIS menu. From there the messages proceed to downloading to the 1AESS switch indicated at 78, 80, 82, 84.

With respect to the 5ESS packets diverted at 100, a selection of the 5ESS office and MTS file for formatting or printing is made at 118. The print or format decision occurs at 120 and files to be printed proceed to 122. Those files to be processed via ATIS proceed to 124 where Recent Change messages are created by the ATIS system. At 126 the technician performs a "stare and compare" inspection and makes the edit/no edit decision at 128. Editing occurs at 130 and those files for downloading are forwarded to the selected Data Kit channel to the involved 5ESS office at 132. A check of the channel selection is made at 134 and correctly channeled forms are transferred at 136 to the dedicated maintenance (MTCE) channel. The RC messages are inputted to the 5ESS switch at 138. A rejection is detected at 140 and error messages captured at 142. These proceed back to the edit file 130. The acceptable RC messages proceed to the 5ESS office at 144 where the 5ESS switch is updated with the recent changes. The program concludes at 146 and 148.

Figure 21A:
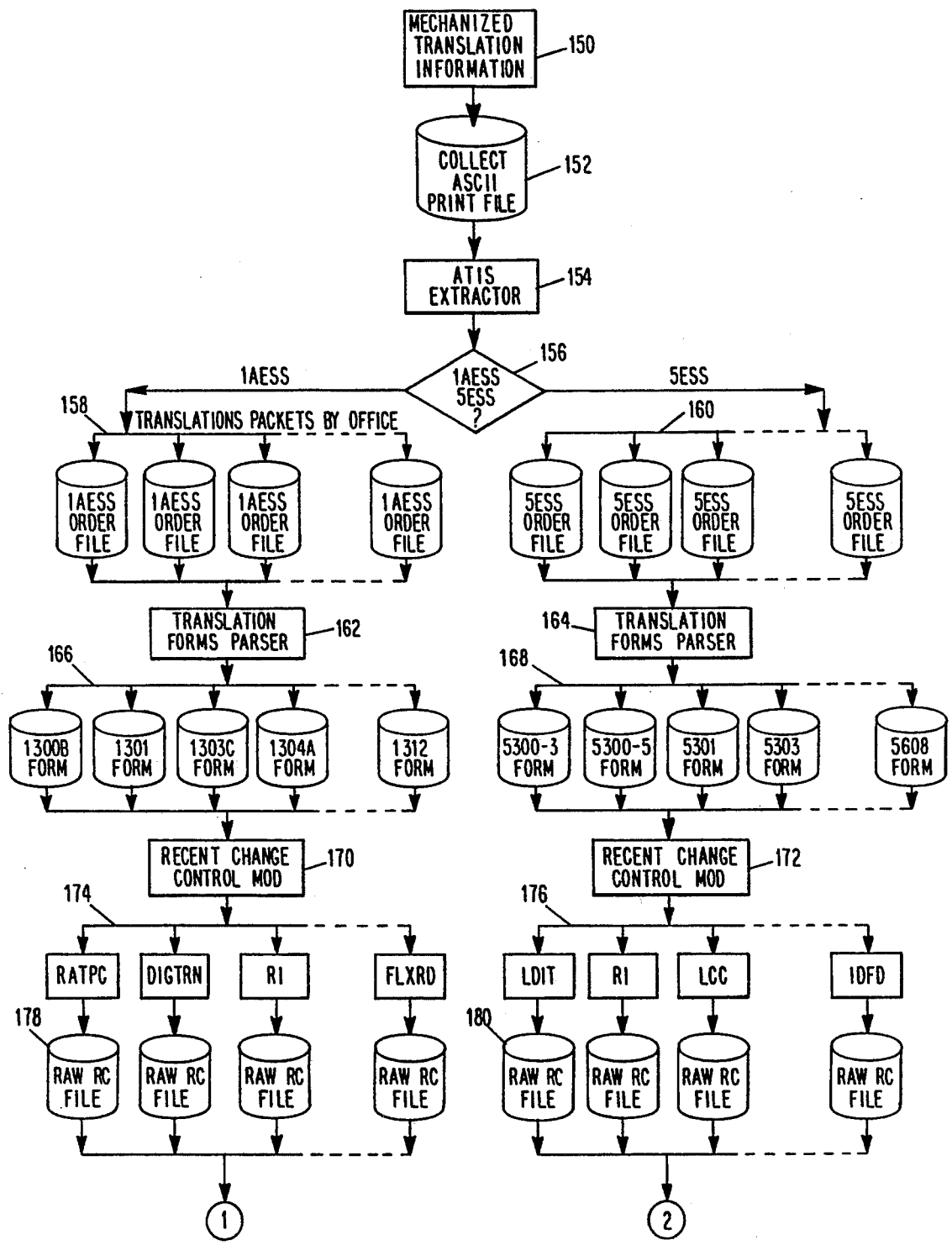
FIGS. 21A and B illustrate the architecture of the ATIS system.
Figure 21B:
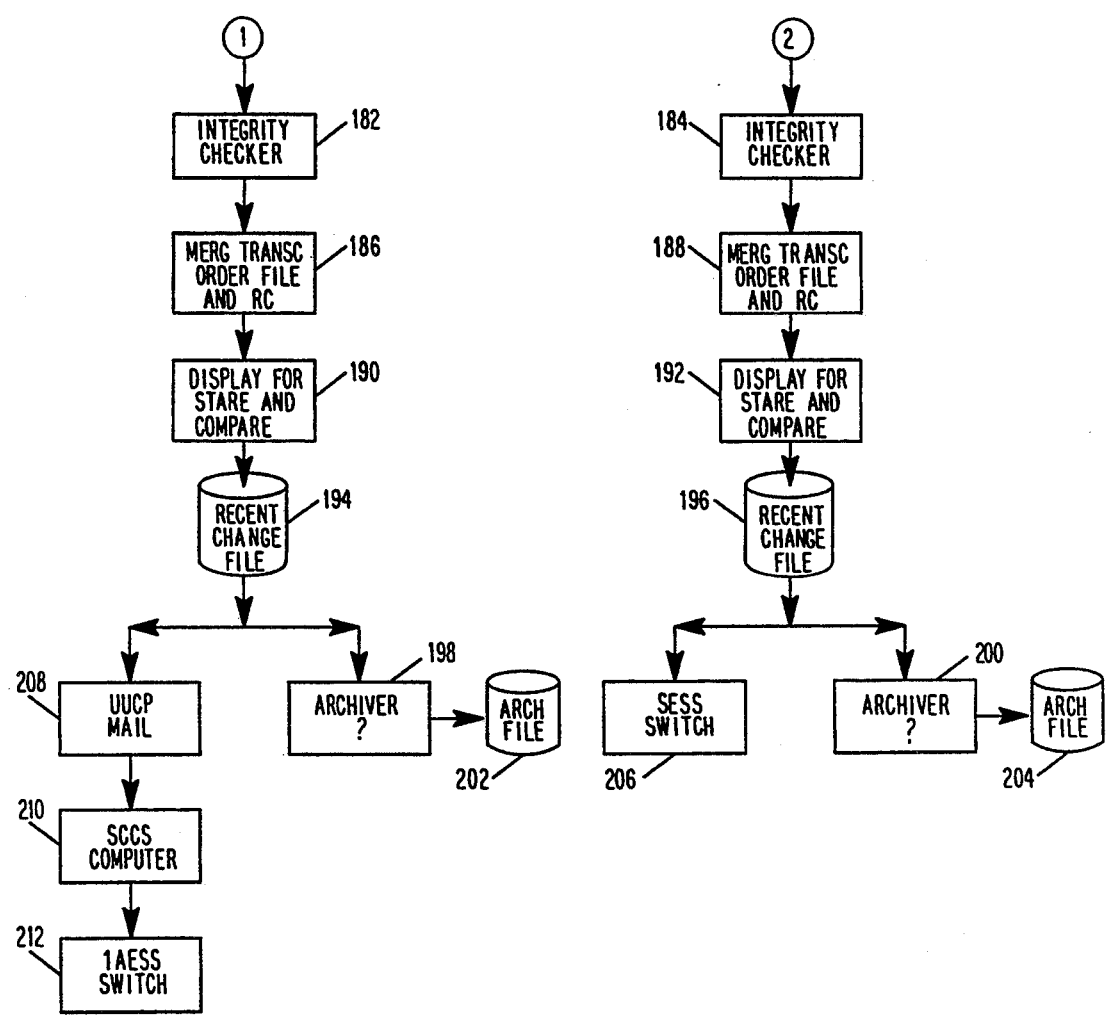

Referring to FIGS. 21A and B there is illustrated the architecture of the ATIS system. The MTS translation packet is created at 150, collected in an ASCII print file at 152 and fed to the ATIS extractor step at 154. The 1AESS and 5ESS packets are separated at 156 and the translation packets are stored by office at 158 and 160, respectively. The translation forms parsers 162 and 164 direct the information to the appropriate form data banks 166 and 168 for forms 1300B, 1301, 1303C, 1304A, 1312, etc., and 5300-3, 5300-5, 5301, 5303 and 5608, etc. The Recent Change control modules 170 and 172 direct the forms to the corresponding Recent Change formats 174 and 176 and to storage in the raw RC files 178 and 180. The raw RC messages are subject to integrity checkers 182 and 184 from which they proceed to the Merge Translation and Order file and RC step at 186 and 188. The messages are then fed to the display for stare and compare steps at 190 and 192 from which they proceed to Recent Change files 194 and 196. Archiving occurs at 198, 200 and 202, 204. The 5ESS messages proceed directly to the switch at 206 while the 1AESS messages proceed via UUCP mail 208, SCC computer 210 to 1AESS switch to 12.

It will be apparent from the foregoing that the system and method of the invention provide an Automated Translation Input System (ATIS) to convert Mechanized Translation System (MTS) orders into Recent Change messages that can be loaded into a program controlled switch without enhancement or changes in the MTS program to provide a significant saving in SCC labor hours. The new system and method permit using the output of the MTS which would otherwise constitute a printed form for inputting the Automated Translation Input System (ATIS) where the forms are analyzed, the associated Recent Changes are analyzed, and the Recent Change messages are prepared. The thus prepared Recent Change messages are inspected by the SCC technician who, through a manual option in the ATIS system, gives the command to download the translations directly into the switch. This eliminates the need for manual key preparation of the Recent Change forms by the SCC technicians and results in an elimination of keying errors and a significant saving in time. At the same time the MTS may provide its conventional printed forms to permit parallel handling of those change messages not selected for handling by ATIS.

ATIS can create Recent Changes for the following translation type activities: lines, trunks, routing, charging, measurements, office features, e.g. Centrex, operator services, office operations and office data, and mechanically load the recent changes into the following switch types: AT&T's 1/1A ESS, AT&T's 5ESS, AT&T's 4ESS, Northern Telecom's DMS100, and Siemans Stromberg-Carlson's EWSD.

ATIS can interface with any mechanized system containing central office translation data in a fixed format such as:

AT&T's Mechanized Translation System (MTS)

Bellcore's Trunk Integrated Record Keeping System (TIRKS)

Bellcore's Circuit Installation and Maintenance Assistance Package (CIMAP)

Siemans Stromberg-Carlson's Translation Administration Process (TAP)

AT&T's Remote Memory Administration System (RMAS)

AT&T's Switch Access Remote Test System (SARTS)

C&P's Service Order Administration & Control Systems (SOACS)

Bellcore's PREMIS Information System

Bellcore's Facilities Assignment Control System (FACS).

Recent Changes can be loaded one form at a time or all forms can be automatically sequenced correctly for downloading into the switch as an entire packet.

ATIS allows for on-screen editing, printing and saving of Recent Change messages.

ATIS allows the technician to determine the number of Recent Changes for downloading. In other words, the file can be split and loaded in smaller segments, if desired.

ATIS allows error messages from the switch to be captured in a data base file for review by the technician for correction. Errors are flagged and the corrections can be made using edit capability and the edited file can be resent to the switch.

Files can be transferred to the switch using any of the following methods, as determined by the Technician:

a. Copy to SCC's computer and use "send office" command using maintenance channel.

b. On-line transfer directly to switch using maintenance channel or other recent change/verify channel.

c. Clerk-file that allows recent changes to be scheduled for off-hours input. The time can be selected by the Technician.

d. Generate 9-track tape that can be delivered to the office for input at the switch using a tape drive.

The invention provides a user-friendly tool that permits COT's or SCC's to quickly process MTS request packets for program controlled switches. Among the advantages of the new system and method are:

The elimination of much of the manual RC typing required by COTs or SCCs.

The elimination of the troublesome RC typing errors.

Reducing the interval between MTS completion to SCC completion date.

Easing translation input for major projects requiring network rearrangement.

Permitting quick rerouting of calls or rebuilding of translations in the case of an emergency.

Requiring no method or procedural changes in the SCC.

Providing comprehensive support in the form of on-site installation and testing of software, full training of COTs or SCCs, a continual updating of forms as new generics are introduced, and on-going maintenance and development.

Relatively low cost.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

We claim:

1. A mechanized translation system (MTS) operated in a telecommunications network having stored program control (SPC) switches controlled by switching control centers (SCC), said mechanized translation system including computer, storage and printer means for generating MTS forms containing information for effecting translations in said SPC switches, for storing said information and for presenting said information in printed forms, said MTS being operatively connected to said switching control centers and having manually operable means for translating said information in said MTS forms into messages in switch command language for effecting translations in at least certain of the programs controlling said SPC switches, said MTS further comprising;
   a) first automated translation (AT) storage means having stored therein switch command language data corresponding to predetermined information in predetermined MTS forms;
   b) AT computer means associated with said first AT storage means, said AT computer means having access to said MTS storage means to permit inspection of the contents thereof and selection from said contents of MTS forms containing information corresponding to said switch command language data stored in said first AT storage means, said AT computer means including terminal node means operable to access said predetermined MTS forms in said MTS storage means, to store said MTS forms, to permit comparison by a human operator of said MTS forms to said predetermined information in predetermined forms for which switch command language data is stored in said first AT storage means, and to produce at said terminal node means a switch command language translation of said predetermined information; and
   c) means for inputting said switch command language translation at said terminal node means to a selected SPC switch.

2. A mechanized translation system according to claim 1 wherein said means for inputting said switch command language translations at said terminal node means to the selected SPC switch includes mass storage means and means for mass inputting the contents of said mass storage means to the selected SPC switch.

3. A mechanized translation system according to claim 1 where said means for inputting said switch command language translation at said terminal node means to a selected SPC switch comprises a maintenance channel directly connected to the selected SPC switch.

4. A mechanized translation system according to claim 1 including means for facilitating comparison by a human operator of said selected MTS forms information to the translations thereof produced by said AT computer means, and means for facilitating editing by a human operator of said translations before connection of said translations to said terminal node means.

5. A mechanized translation system according to claim 1 wherein said AT computer means has associated therewith second AT storage means for storing said forms selected from the forms accessed in said MPS storage means.

6. A mechanized translation system according to claim 1 including archival storage means for storing selected information from said MTS storage means.

7. A mechanized translation system according to claim 1 including printing means associated with said AT computer means for printing designated forms in MTS format.

8. A mechanical translation system according to claim 1 wherein said means for inputting said switch command language translations at said terminal node means to a selected SPC switch includes a dedicated maintenance channel.

9. A mechanized translation system according to claim 1 wherein said AT computer means includes means for capturing error messages from the selected SPC switch and editing means for facilitating correction by a human operator of said errors and inputting a corrected translation to said terminal node means and said switch.

10. A mechanized translation system according to claim 2 wherein said mass storage means includes a nine channel tape.

11. A mechanized translation system according to claim 3 wherein said maintenance channel comprises a teletype channel.

12. A method for operating a mechanized translation system (MTS) operated in a telecommunications network having stored program control (SPC) switches controlled by switching control centers (SCC), said mechanized translation system including computer, storage and printer means for generating MTS forms containing information for effecting translations in said SPC switches, for storing said information and for presenting said information in printed forms, said MTS operatively connected to said switching control centers having manually operable means for translating said information in said MTS forms into messages in switch command language for effecting translation in at least certain of the programs controlling said SPC switches, the method comprising the steps of;
   a) generating in said MTS and storing in said MTS storage means said information contained by said MTS forms;
   b) storing translations of predetermined information from selected MTS forms as messages in switch command language;
   c) accessing said stored information contained in said selected MTS forms generated by said MTS and selecting therefrom said predetermined information for which translations into switch command language were stored, and storing in said MTS storage means the identity of the selected MTS forms;
   d) forwarding said predetermined information from said MTS storage means to said SCC and manually translating forms not identified in step (c);
   e) comparing said predetermined information from forms selected in step (c) to said predetermined form information for which translations were stored pursuant to step (b) and automatically translating said predetermined information into switch command language;
   f) outputting said automatically created switch command translation language to a terminal node means;
   g) connecting said terminal node means to a selected SPC switch to effect translation of the program controlling said SPC switch pursuant to the translations resulting from step (e); and
   h) connecting said manual translations created pursuant to step (d) to said terminal node means and connecting said terminal node means to said selected SPC switch to effect translation of the program thereof pursuant to said manual translations.

13. A method according to claim 12 wherein the step of connecting said terminal node means to a selected SPC switch to effect translation of the program controlling said SPC switch pursuant to the translations resulting from step (e) includes the intermediate step of storing said translations in mass storage means and thereafter mass inputting of the contents of said mass storage means to the selected SPC switch.

14. A method according to claim 12 wherein said step of connecting said terminal node means to a selected SPC switch to effect translation of the program controlling said SPC switch pursuant to the translations resulting from step (e) includes connecting said terminal node means to a maintenance channel directly connected to the selected SPC switch.

15. A method according to claim 12 including the step of manually comparing the translations resulting from step (e) to the MTS forms information selected pursuant to step (c) and editing said translations before connection of said translations to said terminal node means.

16. A method according to claim 12 including the intermediate step of storing said forms selected in step (c) prior to effecting said comparison of step (e) and performing step (e) by comparing said forms as thus stored to said predetermined form information for which translations were stored pursuant to step (b) and automatically translating said forms into switch command language.

17. A method according to claim 12 including the step of storing for archival purposes selected information from said stored MTS form information.

18. A method according to claim 12 including the step of printing in MTS format predesignated forms selected pursuant to step (c).

19. A method according to claim 12 wherein said step of connecting said terminal node means to a selected SPC switch to effect translation of the program controlling said SPC switch pursuant to the translations resulting from step (e) includes the step of connecting said terminal node means to said switch via a dedicated maintenance channel.

20. A method according to claim 12 including the step of capturing error messages from the selected SPC switch to which translations were connected pursuant to step (g), and editing the translations resulting from step (e) to eliminate the errors and inputting the corrected translations to said terminal node means and said SPC switch.

* * * * *